(12) United States Patent
David et al.

(10) Patent No.: US 9,500,043 B2
(45) Date of Patent: Nov. 22, 2016

(54) THREADED JOINT WITH LOW TIGHTENING TORQUE

(71) Applicant: VALLOUREC OIL AND GAS FRANCE, Aulnoye-Aymeries (FR)

(72) Inventors: Didier David, Ruesnes (FR); Fabien Carrois, Le Quesnoy (FR)

(73) Assignee: VALLOUREC OIL AND GAS FRANCE, Aulnoye-Aymeries (FR)

( * ) Notice: Subject to any disclaimer, the term of this patent is extended or adjusted under 35 U.S.C. 154(b) by 260 days.

(21) Appl. No.: 14/364,516

(22) PCT Filed: Dec. 20, 2012

(86) PCT No.: PCT/FR2012/000542
§ 371 (c)(1),
(2) Date: Jun. 11, 2014

(87) PCT Pub. No.: WO2013/098491
PCT Pub. Date: Jul. 4, 2013

(65) Prior Publication Data
US 2014/0367119 A1      Dec. 18, 2014

(30) Foreign Application Priority Data

Dec. 29, 2011 (FR) ..................................... 11 04147

(51) Int. Cl.
*F16L 25/00* (2006.01)
*E21B 17/042* (2006.01)
*F16L 15/00* (2006.01)

(52) U.S. Cl.
CPC ............ *E21B 17/042* (2013.01); *F16L 15/001* (2013.01); *F16L 15/004* (2013.01)

(58) Field of Classification Search
USPC ........................................ 285/334, 333, 390
See application file for complete search history.

(56) References Cited

U.S. PATENT DOCUMENTS 2,450,452 A * 10/1948 Scott ..................... E21B 17/042
                                                                      285/115
2,532,632 A * 12/1950 MacArthur ......... E21B 17/0423
                                                                    285/332.2

(Continued)

FOREIGN PATENT DOCUMENTS

CN            1155639 A        7/1997
CN         101233357 A         7/2008

(Continued)

OTHER PUBLICATIONS

International Search Report issued Mar. 7, 2013, in PCT/FR2012/000542, filed Dec. 20, 2012.

*Primary Examiner* — Aaron Dunwoody
(74) *Attorney, Agent, or Firm* — Oblon, McClelland, Maier & Neustadt, L.L.P.

(57) ABSTRACT

A threaded tubular connection includes a first body terminated by an external abutment, and linked to a male threading prolonged by a terminal portion forming an internal abutment surface at its axial end, such that the connection includes a second body defining a bearing surface for the external abutment at one free end, and including an initial portion on its internal surface connecting the bearing surface to a female threading, made up onto the male threading, and terminating in an internal shoulder facing the internal abutment, such that the linking profile between one of the following: the external abutment, the internal abutment, the bearing surface, and/or the internal shoulder, has a profile with a variable diameter in cross section, over a length of the body which is less than the terminal portion or initial portion.

15 Claims, 4 Drawing Sheets

(56) References Cited

U.S. PATENT DOCUMENTS

| | | | |
|---|---|---|---|
| 3,870,351 A * | 3/1975 | Matsuki | E21B 17/042 285/334 |
| 4,548,431 A | 10/1985 | Hall et al. | |
| 5,687,999 A | 11/1997 | Lancry et al. | |
| 5,810,401 A * | 9/1998 | Mosing | E21B 17/0426 285/333 |
| 5,908,212 A | 6/1999 | Smith et al. | |
| 6,047,997 A * | 4/2000 | Olivier | F16L 15/08 285/331 |
| 6,485,061 B1 * | 11/2002 | Mosing | F16L 15/008 285/333 |
| 6,485,063 B1 * | 11/2002 | Olivier | E21B 17/042 285/331 |
| 7,210,710 B2 * | 5/2007 | Williamson | E21B 17/042 285/333 |
| 2005/0189147 A1 | 9/2005 | Williamson et al. | |
| 2005/0248153 A1 | 11/2005 | Sugino et al. | |
| 2008/0238094 A1 | 10/2008 | Craig et al. | |
| 2008/0265575 A1 | 10/2008 | Charvet-Quemin et al. | |
| 2009/0200798 A1 * | 8/2009 | Hamamoto | E21B 17/042 285/334 |
| 2010/0308577 A1 | 12/2010 | Chin | |
| 2011/0227338 A1 * | 9/2011 | Pollack | F16L 15/004 285/355 |
| 2014/0054890 A1 * | 2/2014 | Do | E21B 17/042 285/390 |
| 2014/0265320 A1 * | 9/2014 | Pollack | E21B 17/042 285/334 |
| 2015/0001841 A1 * | 1/2015 | Oshima | E21B 17/08 285/94 |
| 2015/0145247 A1 * | 5/2015 | Zhu | E21B 17/042 285/333 |

FOREIGN PATENT DOCUMENTS

| | | |
|---|---|---|
| CN | 101668923 A | 3/2010 |
| FR | 2 904 031 A1 | 1/2008 |
| WO | 98/50721 A1 | 11/1998 |
| WO | 2004/109173 A1 | 12/2004 |
| WO | 2006/092649 A1 | 9/2006 |

* cited by examiner

THREADED JOINT WITH LOW TIGHTENING TORQUE

The invention relates to tubular components used for drilling or working oil or gas fields. In particular, the invention is applicable to components used at sea from offshore platforms, in particular to components disposed in landing strings.

A pipe known as a marine riser connects the offshore platform to the sea bed and provides topological and hydraulic continuity between the floating vessel and the interior of the well formed from the sea bed. The landing string is dropped into said pipe.

Landing strings are used to put down elements such as casings, tubing or various pieces of equipment such as submarine wellheads to be disposed at the entry to the well from the sea bed. In particular, said subsea wellheads may comprise safety devices for preventing excess pressure in the well. Such elements are heavy and a tensile load of several thousand tonnes is exerted on each tubular component forming the landing string.

A landing string is formed by a series of tubular components made up end-to-end. Conventionally, each component comprises a male threaded connection end, known as the pin, axially opposite to a female threaded connection end, known as the box.

The male connection end extends from an external abutment shoulder forming an annular bearing zone for a front face of a female end with which it is intended to be made up. The connection is made when the front face abuts against the shoulder. The connection has to withstand at least a thousand tonnes exerted in tension.

In this regard, the makeup torque to be applied in order to produce a reliable connection in the threaded connection is determined by means of a profile of the makeup torque to be applied.

Figure 1:
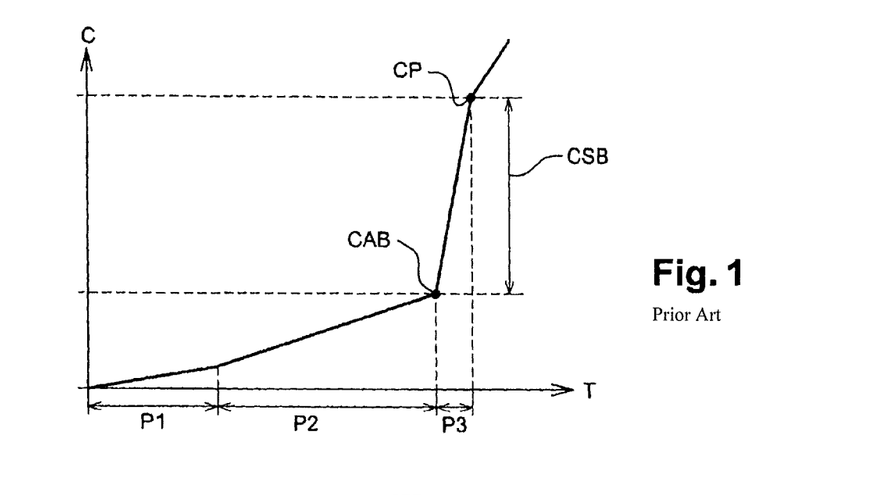
FIG. 1 is a diagrammatic view of a makeup torque curve for a threaded connection as a function of the number of turns made.

The curve in FIG. 1 expresses the makeup (or clamping) torque of a connection as a function of the number of rotational turns made. As can be seen, a profile for the makeup torque for connecting two threaded ends can be broken down into three portions.

In a first portion P1, the external threads of the male threaded element (or pin) of a first component of a threaded tubular connection as yet have no radial interference with the internal threads of the corresponding female threaded element (or box) of a second component of the same threaded tubular connection.

In a second portion P2, the geometrical interference of the threads of the male and female threaded elements generates a radial interference which increases as makeup continues (generating a small but increasing makeup torque).

In a third portion P3, the front end surface of the male threaded element is in axial abutment with the annular surface of a makeup abutment of the female threaded element. This third portion P3 corresponds to the terminal phase of makeup.

The makeup torque CAB which corresponds to the end of the second portion P2 and to the start of the third portion P3 is termed the shouldering torque (CAB).

The makeup torque CP which corresponds to the end of the third portion P3 is termed the yielding torque (CP). Beyond this yielding torque CP, it is assumed that the male makeup abutment (end portion of the male threaded element) and/or the female makeup abutment (zone located behind the annular abutment surface of the female threaded element) is (or are) subjected to plastic deformation, which may degrade performance as regards the tightness of the contact between the sealing surfaces.

The difference between the values for the yielding torque CP and the shouldering torque CAB is termed the torque on shoulder resistance CSB (CSB=CP−CAB). A threaded tubular connection has an optimized interference fit at the end of makeup, which is the guarantee for optimized mechanical strength of the threaded connection, for example as regards tensile forces, but also as regards accidental break-out in service, and for optimized sealing performances.

The designer of a threaded connection is thus obliged to define, for a given type of threaded connection, a value for the optimized makeup torque which, for all connections of this type of connection, must be lower than the yielding torque CP (in order to prevent yielding of the abutments and the concomitant disadvantages) and be higher than the shouldering torque, CAB.

Ending makeup with a torque which is less than the CAB cannot guarantee correct relative positioning of the male and female elements and thus of an effective interference fit between their sealing surfaces. Furthermore, there is a risk of break-out. The effective value of the shouldering torque CAB fluctuates greatly from one connection to another for the same type of connection as it depends on the diametric and axial machining tolerances of the male and female threads and sealing surfaces; the optimized makeup torque should be substantially higher than the shouldering torque CAB.

As a consequence, the higher the value of the torque on shoulder resistance CSB, the larger the margin for defining the optimized makeup torque, and the more the threaded connection will be resistant to operational stresses.

In the oil industry, specification API 7 regarding rotary drilling components (API stands for "American Petroleum Institute") is provided for a particular type of threading, as well as a simple abutment system (termed "external"). In the case of a female element, said external abutment is provided by the free end portion of said element, and in the case of a male element it is provided by a radial annular (external) surface terminating a substantially cylindrical body, defining a shoulder from the external surface of the body and linked via a cylindrical base with an external diameter which is smaller than that of the body, to a connection portion which is generally tapered in shape, with an external diameter which decreases with distance from the base, and provided on the outside with a male threaded portion which can be made up into a corresponding threaded portion of a female element of another drilling component, said threaded portion extending substantially up to the free end of the male element.

In the oil industry, specification ISO-13628 is of more specific application to risers, in particular to landing strings.

Various manufacturers of drilling components have proposed male and female elements with more developed threads and also with a double abutment. Those specific propositions are aimed at allowing a larger torque to be transmitted for comparable dimensions. In contrast, in order to function correctly, the double abutment male and female elements have to be properly adjusted for the loading of the two abutments to be harmonious.

The prior art discloses the documents FR-2904031, U.S. Pat. No. 4,548,431 and WO2006092649, which concern a tubular component for forming a drill string comprising threaded connecting elements with a double abutment having a very high, optimized makeup torque, such that it is substantially higher than the torsional torque to which the component might be subjected in the well being drilled.

A prior art document, US20100308577, discloses a landing string the components of which have a wall thickness of more than 12.7 cm, with an optimized makeup torque of more than 75000 ft·lbs. In particular, the component in that document has an annular contact surface area between the abutment shoulder of the male end of said component and the front face of a female end of a complementary component such that said contact surface has an external diameter in the range 19.05 to 21.59 cm.

However, landing strings are also used in the cementing operation to fix the casing which has been dropped into place, or to temporarily close off the inlet to the well with a view to future working or at the end of a well working period.

During cementing operations, cement is poured into the landing string and cement residues may become stuck inside the column and render it difficult to dismantle when the landing string is removed from the pipework to be replaced by strings for carrying on with drilling or for working a well.

Further, during the cementing operation, the internal pressure in the landing string may be very high, for example of the order of thousands of tonnes/m$^2$.

Prior art landing strings cause a problem with assembling and dismantling because solid connections must be guaranteed between the tubular components because of the tensile forces to which they will be subjected and also to be able to clean them easily between uses. In fact, the non-productive time of such strings must be limited, and their integrity in operation has to be preserved. To this end, it is necessary to be able to clean them properly without in any way increasing the makeup torques and thus the breakout torques used to manipulate this type of string on site. However, assembling and dismantling tools which are available on platforms, in particular offshore platforms, are limited as regards the makeup torque and it is very difficult when at sea to achieve precision in manipulating them. Such makeup tools which are available generally have a makeup capacity limited to 70000 ft·lb, maximum 75000 ft·lb. In addition, a makeup tool with a capacity of more than 75000 ft·lb is very expensive, non-standard and rarely present on such platforms.

A landing string which is subjected on-site to a tensile force of more than a thousand tonnes is subjected, at its connection, to a modification in the lubrication regime of the fluid deposited on the cooperating makeup threads. That modification will contribute to an increase in frictional loads between the threads upon breakout. Thus, there is a load on the makeup/breakout tools which must both bring the connection to its optimum makeup torque before use and also be capable of breaking out those same connections after use.

In addition, such landing strings are not in permanent use on the platforms. In addition, there is a need to be able to store the components of said strings temporarily without having to take too many precautions. Such landing string components are conventionally stored in a vertical position, in particular resting on the male connection end. Thus, there is a need for provide a robust male connection.

Thus, the invention aims to propose tubular components that can overcome some or all of the problems identified above and in particular can facilitate handling of the tubular components by proposing large tolerances as regards the torque to be applied, while guaranteeing the quality of the connection.

Thus, the invention provides a threaded tubular connection comprising a first tubular component made up onto a second tubular component, said tubular components being intended for exploration or working a hydrocarbon well, in particular to form a landing string;

the first tubular component comprising a first substantially cylindrical body with an axis of revolution terminated by an external abutment, said external abutment being linked to the external circumference of the first body via a fourth profile with an external diameter which increases from the external abutment towards the first body, and linked to a male threaded connection portion extended by a terminal non-threaded portion forming an internal abutment surface at its axial end, such that the internal abutment is linked to the internal circumference of the first body via a first profile with an internal diameter decreasing from the internal abutment towards the inside of said body;

the second tubular component comprising a second substantially cylindrical body defining a bearing surface at one free end for the external abutment, said bearing surface being linked to the external circumference of the second body via a third profile with an external diameter which increases from the bearing surface towards the body, the body having an initial non-threaded portion on its internal surface linking the bearing surface to a female threaded connection portion which can be made up onto the male threaded connection portion, and terminating in an internal shoulder facing the internal abutment, the internal shoulder being linked to the internal circumference of the second body via a second profile with an internal diameter which decreases from the internal shoulder towards the inside of the body;

characterized in that at least one of the first profile or the second profile is convex or concave; and in that the length of the first profile and/or the second profile along the axis of revolution is more than 1/16" (1.5875 mm) and less than the length of the terminal portion; and/or in that the length of the third profile and/or the fourth profile along the axis of revolution is more than 1/16" (1.5875 mm) and less than the length of the initial portion.

The minimum threshold of 1/16" corresponds to a threshold which allows for subsequent refacing of the connection.

When the internal shoulder faces the internal abutment, when the connection is formed, the internal shoulder may be in contact with or at a distance from the internal abutment.

In particular, a concave profile can be used to obtain an improved result as regards the transmission of applied forces and thus limit thereby the risks of fatigue and rupture. On the other hand, a convex profile can be used to improve the hydraulic performances of the connection.

As an example, at least one of the first profile or the second profile may be exclusively convex or exclusively concave.

Advantageously, at least one of the first profile or the second profile is not planar.

As an example, at least one of the first profile or the second profile may comprise a planar portion and a convex portion in succession; or a planar portion and a concave portion in succession, or even comprise three portions, respectively planar, concave and convex.

In a variation, at least one of the first profile or the second profile may comprise two planar portions in succession forming an angle between them in order to create either a concavity or a convexity.

Advantageously, the lengths (L1, L2, L3, L4) of the first (41), second (42), third (43) and fourth (44) profiles may be in the range 3 mm to 50 mm, preferably in the range 10 to 25 mm, more preferably in the range 15 to 20 mm.

Advantageously, at least one of the third profile or the fourth profile may be convex or concave.

As an example, at least one of the third profile or the fourth profile may be exclusively convex or exclusively concave.

Advantageously, at least one of the third profile or the fourth profile may not be planar.

As an example, at least one of the third profile or the fourth profile may comprise a planar portion and a convex portion in succession; or a planar portion and a concave portion in succession, or even comprise three portions, respectively planar, concave and convex.

In a variation, at least one of the third profile or of the fourth profile may comprise a succession of two planar portions forming an angle between them so as to create either a concavity or a convexity.

Advantageously, the third profile may be symmetrical with the fourth profile. Such a configuration has the advantage of preventing the concentration of stresses in the vicinity of the contact plane between the external abutment BE and the bearing surface SA, and also of preventing deformation of the materials respectively forming the first and the second body.

More advantageously, the first profile may be symmetrical with the second profile. Such a configuration has the advantage of preventing the concentration of stresses in the vicinity of the contact plane between the internal abutment and the internal abutment, when they are in contact, and also of preventing deformation of the materials respectively forming the first and the second body.

As an example, one of the profiles may have an inclination of more than 10°.

In particular, one of the profiles may have a portion with a convex curvature.

In a variation, one of the profiles may have a portion with a concave curvature.

As an example, one of the profiles may be an arc of a circle or an ellipse.

Advantageously, the internal abutment may be linked to the terminal portion via a first inclined portion, and the internal shoulder may be linked to a second base prolonged by the female connection portion via a second inclined portion, the two inclined portions being secants and each forming a non-zero angle with the contact plane between the internal abutment and the internal shoulder. Such a configuration has the advantage of preventing the concentration of stresses in the vicinity of the contact plane between the internal abutment and the internal shoulder, when they are in contact, and also of preventing deformation of the materials respectively forming the first and second body; this is more the case if the inclined portions are symmetrical.

In particular, the first and the second inclined portion may have a common vertex. This configuration can prevent the abutment surface from becoming indented. For the same reason, the first profile may have an end which is common with one end of the second profile.

In similar manner, the bearing surface may be linked to the initial portion via a third inclined portion and the external abutment may be linked via a fourth inclined portion to a base prolonged by the male connection portion, the two inclined portions being secants and each forming a non-zero angle with the contact plane between the external abutment and the bearing surface. Such a configuration has the advantage of preventing the concentration of stresses in the vicinity of the contact plane between the external abutment BE and the bearing surface SA, and also of preventing deformation of the materials respectively forming the first and second body; this is more the case if the inclined portions are symmetrical.

In particular, the third and the fourth inclined portion may have a common vertex. This configuration can prevent the abutment surface from becoming indented. For the same reason, the third profile may have an end which is common with one end of the fourth profile.

Preferably, the internal abutment has a radial thickness, intended to be brought into contact with the internal shoulder, which may be determined so as to be capable of supporting, without observing yielding, a compressive force at least equal to 4.5 times the weight of the body to which it is attached, or at least equal to 1.5 times the weight of at least two, for example at least three, and preferably four, tubular bodies connected end-to-end and terminated axially by said internal abutment. This configuration means that storage of stands composed of two or three pipes of "range 3" length, namely a length of the order of 42.5 ft, or even three or four pipes of "range 2" length, namely a length of the order of 30 ft, is easily accomplished. Such storage at the worksite is known as back racking.

According to the invention, the first body may be welded to one end of a pipe body of revolution such that the external abutment is axially opposed to the weld, and the second body may be welded to one end of another pipe body of revolution such that the bearing surface is axially opposed to the weld. In this case, the bodies C1 and C2 are known as a tool joint.

The invention also pertains to a method for connecting a threaded connection in accordance with any one of the preceding claims, characterized in that a makeup torque greater than the shouldering torque CAB of said connection is obtained by means of tongs having a torque capacity of less than 75000 ft·lb.

The invention will be better understood from the following description made with reference to the accompanying figures. They are presented solely by means of indication and do not in any way limit the invention. In the figures.

Figure 2:
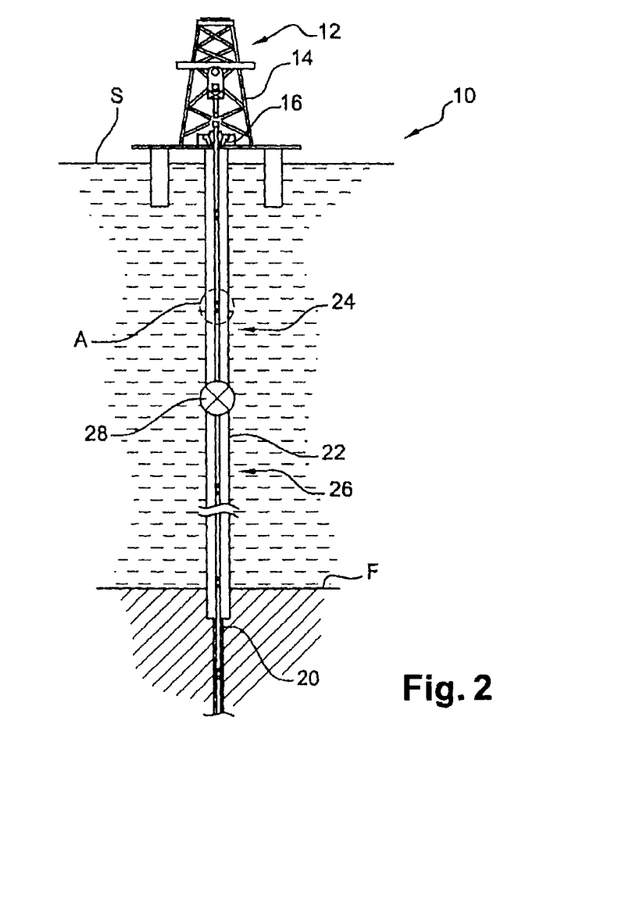
FIG. 2 represents an offshore oil platform illustrating the use of a string of tubular components in accordance with the invention.

FIG. 2 represents a drilling facility 10 in which the present invention may be deployed in an advantageous manner. In the example described, the facility 10 comprises an offshore platform 12 which floats on the sea. The platform 12 comprises a rig 14 equipped with a rotary table 16 as well as numerous accessories for handling and holding the various elements used to make a well and working it. The platform 12 is thus located directly over a submarine well 20 drilled into the sea bed F. The submarine well 20 may or may not have been cased. The facility 10 comprises a string 22 suspended from the platform 12 (known as a marine riser) which forms a conduit between the floating platform 12 and the well 20.

In the example illustrated in FIG. 2, a string to be set in 26, for example a string of casing, is attached by means of a specific makeup length 28 to a landing string 24 in accordance with the invention. This landing string 24 comprises a plurality of tubular components connected end-to-end via their ends.

Various embodiments of a portion of a threaded connection between two tubular components of the landing string 24, zone A in FIG. 2, are presented in detail in FIGS. 3 to 5 and 10.

Figure 3:
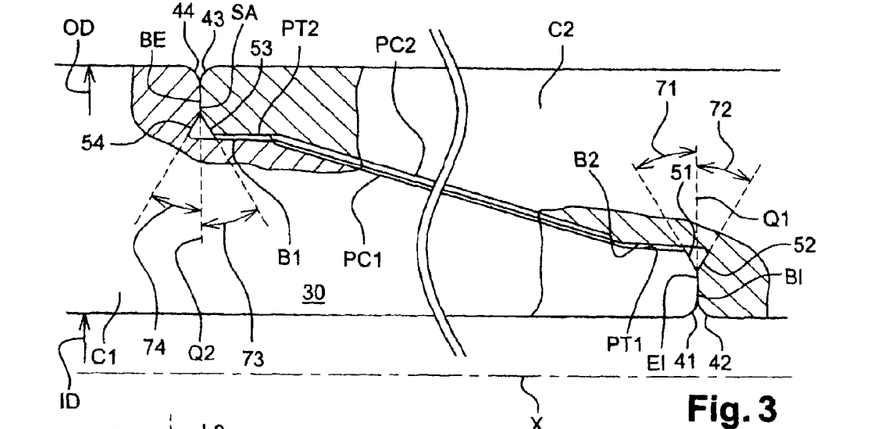
FIG. 3 is a partial longitudinal sectional view of a threaded connection in accordance with a first embodiment of the invention.

FIG. 3 shows a threaded connection 30 of the invention. The connection 30 comprises a first tubular component and a second tubular component.

The first tubular component comprises a first substantially cylindrical body C1 with an axis of revolution X. The first body C1 has a circular cross section with an external diameter OD in the range 2⅞" to 11", more particularly in the range 3.5" to 8¾", and preferably in the range 7" to 8¹¹⁄₁₆", the measurements being given in inches. The body C1 has an external abutment BE at its external circumference. The external diameter decreases from the external abutment BE in the direction of its free end. The external diameter OD is a maximum in the portion of the body C1 at a distance from the free end.

This external abutment BE is in the form of a flat annular indentation. The flat of this indentation forms an acute angle or right angle with the axis X, in particular 90° as in FIG. 3.

The external abutment BE is linked via a base B1 to a male threaded connection portion PC1. The base B1 extends along the axis X and has an annular surface which is substantially parallel to the axis X at its external circumference. The exterior of the connection portion PC1 is generally tapered in shape, with a diameter which decreases with distance from said base B1. The connection portion PC1 carries a threading on its external circumference. The connection portion PC1 is prolonged by a terminal non-threaded portion PT1. The terminal portion PT1 extends along the axis X and forms an annular surface substantially parallel to the axis X at its external circumference.

The body C1 has an internal abutment at its free axial end. This internal abutment BI is in the form of a flat annular surface. The flat of this surface forms an acute or right angle with the axis X, in particular 90° in FIG. 3. The internal abutment BI is connected to the internal circumference defined by the body C1. The body C1 is hollow and defines an axial bore with a circular cross section. In particular, the internal diameter ID of the bore is in the range 1" to 5", for example in the range 2.5" to 4", and more particularly of the order of 3.5", the measurements being given in inches. In the zone of the body C1 for which the external circumference is defined by the external abutment BE, the base B1, the connection portion PC1 and the terminal portion PT1, the internal diameter ID is substantially constant.

The second tubular component comprises a second body C2 which is substantially cylindrical about its axis of revolution. In practice, when the connection is produced between the two bodies C1 and C2, the respective axes of revolution of the bodies coincide. Since FIG. 3 shows the bodies C1 and C2 having been connected, the description below will be made with reference to the axis X.

The second body C2 extends along the axis X. It has a circular cross section with an external diameter which is, for example, substantially equal to the maximum external diameter OD of the first body C1. The axial end of the second body C2, orientated towards the first body C1 when the connection of the invention is formed, defines a bearing surface SA.

The bearing surface SA is in the form of a planar annular surface. The planar portion of this surface forms an acute or right angle with the axis X, in particular 90° in FIG. 3. The bearing surface is linked to the external circumference of the second body C2. It is also linked to the internal circumference of this second body C2 hollow via an initial portion PT2. The initial portion PT2 is not threaded and defines an interior cylindrical circumference with an axis parallel to the axis X. The initial portion PT2 links the bearing surface SA to the female connection portion PC2. The connection portion PC2 has a generally tapered shape on its internal circumference and has a threading which is capable of cooperating with the threading of the male connection portion PC1.

The female connection portion PC2 is prolonged on the inside by a base B2. This base B2 extends substantially along the axis X and defines an annular surface at its internal circumference which is substantially parallel to the axis X. This surface is connected to an internal shoulder EI defined transversely to the axis X. As can be seen in FIG. 3, the internal shoulder EI defines a flat annular surface in a plane perpendicular to the axis X.

When the connection 30 is formed, the bearing surface SA is in contact with the external abutment BE at least over a portion of its surface.

In the example shown in FIG. 3, when the connection 30 is formed, the internal abutment is in contact with the internal shoulder EI at least over a portion of its contact surface.

In the description above, we have described a connection with a double abutment, both external and internal.

In particular, the bodies C1 and C2 are tool joints attached by welding to the axial ends of a pipe body (not shown) and with a mean external diameter which is smaller than that of the bodies C1 or C2.

The invention envisages particular profiles provided either side of the external abutment, the internal abutment, the bearing surface and/or the internal shoulder.

Thus, we can define:
- a first profile 41 between the internal abutment BI and the internal circumference of the first body C1, this first profile 41 corresponding to the internal circumference of the first body C1 where the internal diameter decreases from the internal abutment towards a zone of the first body C1 with a constant internal diameter along a portion of the axis X;
- a second profile 42 between the internal shoulder EI and the internal circumference of the second body C2, this second profile 42 corresponding to the internal circumference of the second body C2 where the internal diameter decreases from the internal shoulder towards a zone of the second body C2 with a constant internal diameter along a portion of the axis X;
- a third profile 43 between the bearing surface SA and the external circumference of the second body C2, this third profile 43 corresponding to the external circumference of the second body C2 where the external diameter OD increases from the bearing surface towards a zone of the second body C2 with a constant external diameter along a portion of the axis X;
- a fourth profile 44 between the external abutment BE and the external circumference of the first body C1, this fourth profile 44 corresponding to the external circumference of the first body C1 where the external diameter OD increases from the external abutment towards a zone of the first body C1 with a constant external diameter along a portion of the axis X.

In addition, we can define:

a first inclined portion 51 between the internal abutment BI and the terminal portion PT1;

a second inclined portion 52 between the internal shoulder EI and the base B2;

a third inclined portion 53 between the bearing surface SA and the initial portion PT2; and a fourth inclined portion 54 between the external abutment BE and the base B1.

Thus, the internal abutment BI is respectively bordered by the first profile 41 and the first inclined portion 51, the internal shoulder EI is bordered respectively by the second profile 42 and the second inclined portion 52, the bearing surface SA is bordered respectively by the third profile 43 and the third inclined portion 53, and the external abutment is respectively bordered by the fourth profile 44 and the fourth inclined portion 54.

The length of the profiles 41 to 44 corresponds to the length, along the axis X, of their projection in a straight line perpendicular to said axis X.

In all cases, this length is more than 1/16" (1.5875 mm).

More particularly, the length of the profiles 41 and/or 42 is less than the length of the terminal portion PT1 measured along the axis X, this length corresponding to the projection of said terminal portion PT1 in the same straight line perpendicular to said axis X. Such a configuration means that a contact zone is provided between the internal abutment and the internal shoulder with a gradual distribution of zones of deformation when the connection 30 is formed and when excess pressure of the order of 5000 psi is applied inside the bodies.

In particular, this length L1 and respectively L2 of the profiles 41 and 42 is defined as less than the length along the axis X of the terminal portion PT1. In particular, the length L1 is equal to the length L2. It may be in the range 3 mm to 50 mm, for example of the order of 20 mm.

More particularly, the length of the profiles 43 and/or 44 is less than the length of the initial portion PT2 measured along the axis X, this length corresponding to the projection of said initial portion PT2 in the same straight line perpendicular to said axis X. Such a configuration means that a contact zone is provided between the external abutment and the bearing surface which means that the seal is guaranteed and there is no detachment of the two surfaces when a tensile load of more than a thousand tonnes is applied between the bodies C1 and C2.

In particular, this length L3 and respectively L4 of the profiles 43 and 44 is defined to be smaller than the length along the axis X of the initial portion PT2. In particular, the length L3 is equal to the length L4. It may be in the range 3 to 50 mm, for example of the order of 15 mm.

In particular, this first profile 41 may, in a longitudinal sectional plane, have a convexity or concavity towards the interior of the first body C1. This convexity or concavity may or may not be monotonic.

When the first profile 41 has a monotonic curvature it may, for example, be a portion of a circle or ellipse. In a variation, the first profile 41 may comprise two inclined planes with a break in the inclination between them.

FIGS. 6 to 9 represent profile types for the profile 41. The profile types for the profiles 42 to 44 can be deduced by symmetry (not shown).

Figure 6:
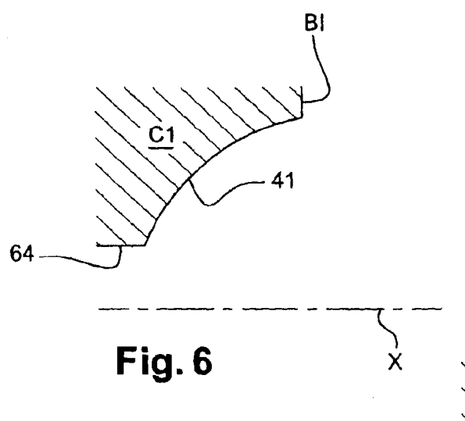
FIGS. 6 to 9 are diagrammatic representations in partial longitudinal section of a profile of a threaded connection of the invention.
Figure 7:
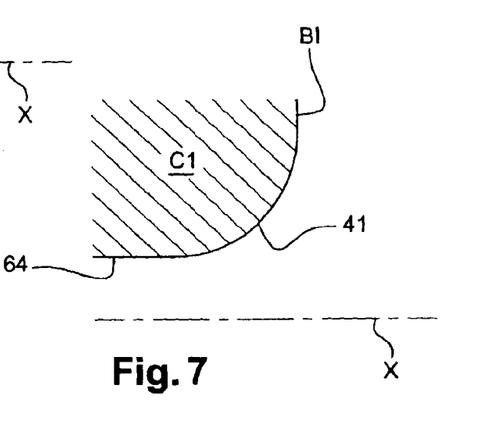
Figure 8:
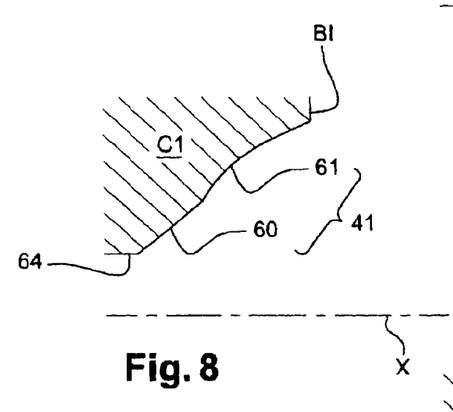

In FIG. 6, one embodiment of the profile 41 represents it as forming a portion of circle which is convex towards the exterior. In FIG. 7, another embodiment of the profile 41 represents it as forming a portion of a circle which is concave towards the exterior. In FIG. 8, another alternative to the embodiment of profile 41 represents it as forming a profile with two sections with a break in the inclination between them.

Figure 9:
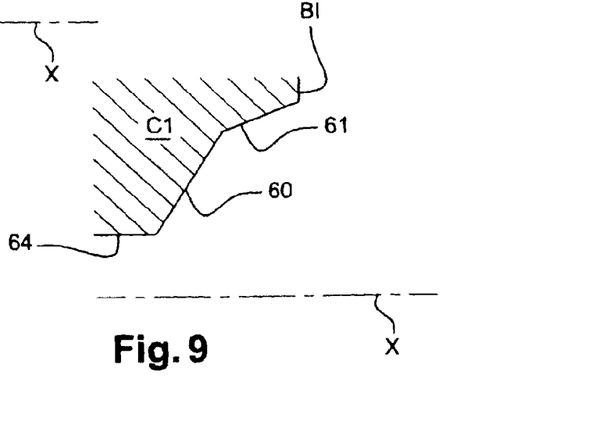

In the example of FIG. 8, the two sections 60 and 61 are both inclined with respect to the axis X. In a variation, not shown, the section 61 linked to the internal abutment may be parallel to the axis X. In the example of FIG. 8, the break in the inclination is formed half way along their length. In a variation, not shown, one of the sections may be longer than the other along the axis X. In the example of FIG. 8, the flat 60 forms an acute angle with the axis X of more than 10°, in particular 20°. In FIG. 8, only the flat 61 is concave towards the exterior. In the variation of FIG. 9, the slopes 60 and 61 together form a concavity. In a variation, one or both sections may be planar or curved.

When the profile is convex, as in FIG. 7, it extends tangentially to the portion 64 of the body C1 having a constant internal diameter along a portion of the axis X. The profile 41 also extends tangentially to the internal abutment BI.

In particular, in the example of FIG. 3, the first profile 41 is convex towards the exterior. In this example it has a constant radius of curvature, for example in the range 10 to 300 mm, in particular of the order of 25 mm. In the example shown in FIG. 3, the profiles 41 and 42 are not symmetrical. The second profile 42 is also convex towards the exterior, but with a radius of curvature R2 which is, for example, in the range 10 to 300 mm, in particular of the order of 25 mm, in particular less than the radius of curvature R1. Preferably, the profiles 41 and 42 are symmetrical and convex.

In a variation of the invention, not shown, another configuration could be envisaged in which the profiles 41 and 42 are not symmetrical with respect to each other, with different curvatures, one being concave, for example, and the other convex.

Figure 4:
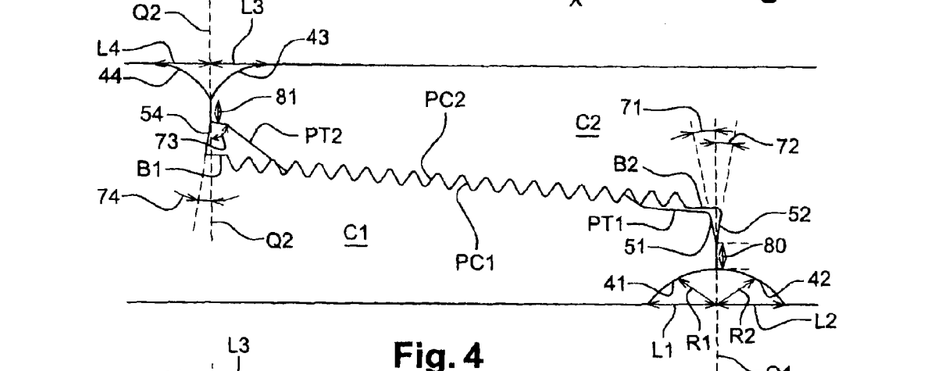
FIG. 4 is a partial longitudinal sectional view of a threaded connection in accordance with a second embodiment of the invention.
Figure 5:
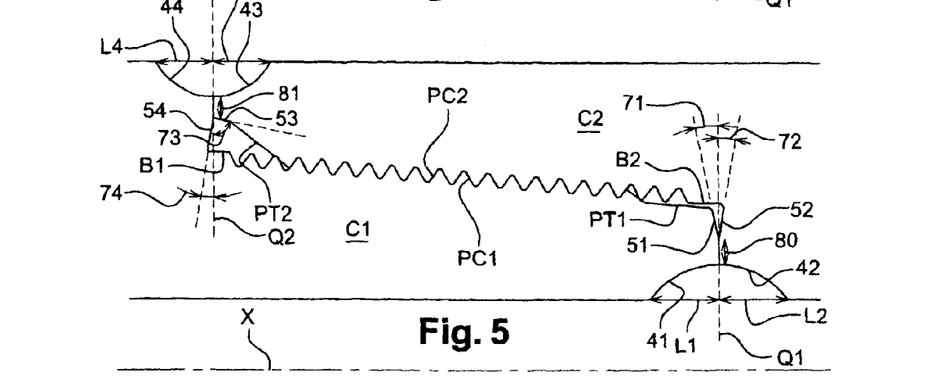
FIG. 5 is a partial longitudinal sectional view of a threaded connection in accordance with a third embodiment of the invention.

In a variation, in FIGS. 4 and 5, the first profile 41 is concave with a radius of curvature in the range 10 to 300 mm, in particular of the order of 25 mm. In these embodiments of FIGS. 4 and 5, the first and second profiles 41 and 42 are symmetrical with respect to a plane Q1 passing through the contact surface between the internal abutment and the internal shoulder.

In particular, in the embodiments of FIGS. 4 and 5, the radius of curvature R1 of the first profile 41 is greater than its length L1. In these embodiments, the profiles 41 and 42 do not together form a profile forming a portion of a circle or ellipse. In fact, together they form two portions of a circle placed tangentially end-to-end. This configuration means that the behavior under pressure is improved. Such a configuration can also prevent the creation of zones of turbulence in the connection and thus avoid pressure drops in the fluid being transported in the string.

Figure 10:
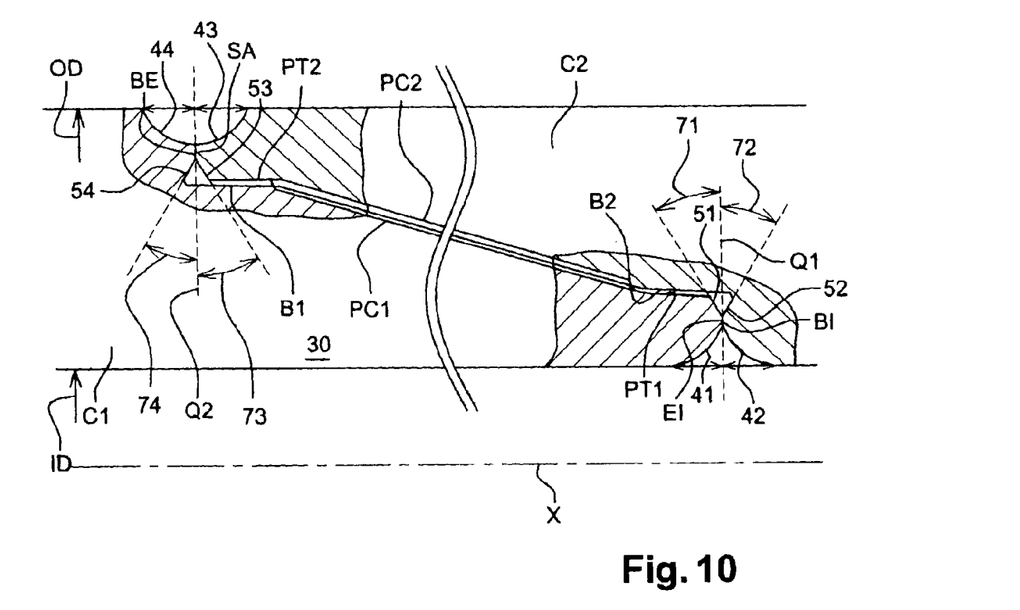
FIGS. 10 and 11 are partial longitudinal sectional views of variations of the threaded connection of the invention.

FIG. 10 corresponds to an inversion of the respectively convex and concave profiles of those represented in FIG. 4.

In the embodiments shown, the profiles 41 and 42 together define a continuous profile for the interior bore of the first and second bodies C1 and C2. In this way, fouling of this interface zone by residues from the cementing process carried out via a string having such connections is prevented.

In particular, in the example of FIGS. 3 and 4, the third profile 43 is convex towards the exterior. In this example it has a constant radius of curvature, for example in the range 5 to 100 mm, in particular of the order of 25 mm. In the examples presented in FIGS. 3 to 5, the third and fourth profiles 43 and 44 are symmetrical with respect to a plane Q2 passing through the contact surface between the external abutment and the bearing surface. This type of configuration is of great advantage in terms of mechanical strength and can prevent detachment in service of the external abutment BE relative to the bearing surface SA.

Figure 11:
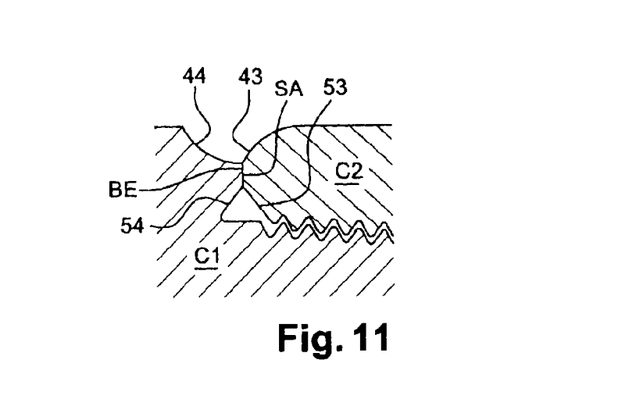

In a variation of the invention, not shown, it is possible to envisage another configuration in which the profiles 43 and 44 are not symmetrical with respect to each other, with a different curvature, one being concave and the other being convex, for example, and/or with a different radius of curvature. As an example, in FIG. 11, the profile 43 is convex while the profile 44 is concave. This differentiation means that it is visible from the outside, and may be useful for the drillman who has to manipulate and identify different classes of tubes.

In a variation, in FIG. 5, the third profile 41 is concave towards the exterior with a radius of curvature in the range 5 to 100 mm, in particular of the order of 25 mm.

In the examples presented in FIGS. 3 to 5, the third and fourth profiles 43 and 44 have a radius of curvature strictly smaller than their respective lengths.

In the example of FIG. 3, the first inclined portion 51 forms an angle 71 in the range 0° to 90° with the plane Q1. The second inclined portion 52 forms an acute angle with this same plane Q1, for example in the range 0° to 45°, adjacent to the angle 72. In the example shown, the angles 71 and 72 are identical. In the variations of FIGS. 4 and 5, the angles 71 and 72 are not equal; the angle 71 may be larger than the angle 72.

In the examples of FIGS. 3 to 5, the inclined portions 51 and 52 cut the plane Q1 at a common vertex. In fact the internal abutment BI and the internal shoulder EI have identical contact heights 80, such that the internal abutment BI exclusively faces the internal shoulder EI. This contact height 80, measured perpendicular to the axis X, is preferably determined so that it can support, without observing yielding, a compressive force at least equal to 4.5 times the weight of the body to which it is attached, or at least equal to 1.5 times the weight of at least two, for example at least three, preferably four, tubular bodies connected end-to-end. This contact height 80 may also be termed the radial thickness.

In the example of FIG. 3, the third inclined portion 53 forms an angle 73 with the plane Q2 in the range 0° to 90°. The fourth inclined portion 54 forms an adjacent acute angle 74 with this same plane Q2. In the example shown, the angles 73 and 74 are identical. In the variations of FIGS. 4 and 5, the angles 73 and 74 are not equal, the angle 74 of the fourth inclined portion being less than the angle 73. In fact, the angle 74 is in the range 0° to 45°, for example.

In the examples of FIGS. 3 to 5, the inclined portions 53 and 54 cut the plane Q2 at a common vertex. In fact, the external abutment BE and the bearing surface SA have identical contact heights 81, so that the external abutment BE exclusively faces the bearing surface SA. This contact height 81, measured perpendicular to the axis X, is determined so that it can support, without observing yielding, a compressive force at least equal to 6 times the weight of the body to which it is attached, or at least equal to 1.5 times the weight of three, preferably four, tubular bodies connected end-to-end. This contact height 81 may also be termed the radial thickness.

For the more particularly envisaged applications of the invention, which concern the field of landing strings and drill pipe risers, insofar as transmission of the torque in operation is almost non-existent at the connections, it is thus possible to reduce the makeup torque for connecting tubular components, making it easier for users to make up a connection in accordance with the invention.

In practice, a makeup torque can be used to create a contact pressure between two abutments, either the external abutment BE with the bearing surface SA or indeed the internal abutment BI with the internal shoulder EI. In fact, the connection of the invention may be a connection with only one abutment, i.e. between the external abutment BE and the bearing surface SA, or a connection with a double abutment as shown in the figures discussed above, and in which the external abutment BE is pressed against the bearing surface SA at the same time as the internal abutment BI is pressed against the internal shoulder.

The makeup torque to be applied to prevent separation of the external abutment BE and the bearing surface SA is a function of the abutment surface area S between the external abutment BE and the bearing surface SA, as well as the respective position of the external abutment BE and the bearing surface SA with respect to the axis of the connection. This position of the surfaces BE and SA, like that of surfaces BE and EI, is controlled by the respective choices of first, second, third and fourth profiles. The same reasoning applies to determining the makeup torque to be applied to prevent separation of the surfaces BE and EI.

The height 80 and respectively the height 81, symbolized here by the letter h, have been determined such that the equation below is satisfied, knowing that in the application field envisaged by the invention, the abutment separation force F may be from 500 000 lbs to 3 000 000 lbs and the pressure P may be from 10 000 to 100 000 PSI, the pressure P designating the mean pressure over the contact length defined between BE and SA respectively or between BI and EI respectively.

$$S=\pi \cdot (A^2-(A-2h)^2)=F/P$$

and in which:

A is the maximum distance of the contact surface defined between BE and SA or alternatively between BI and EI, when the connection is made, with the symmetrical axis of revolution X of the tubular component.

The force F is also a function of the performance of the tubular component, in particular defined by the external diameter OD, its weight and the grade of the material from which it is produced.

With the configuration described just above, a threaded connection 30 is obtained, when the first and second components are assembled one with another with a makeup torque such that the connection is compatible with connections produced in accordance with API standards. In particular, connection is obtained with tongs having a torque capacity of less than 75000 ft·lb, in particular of the order of 68000 ft·lb. Such a configuration has other advantages, such as ease of moving tooling equipment inside the landing string.

A connection of the invention may also be employed between two tubular components intended to form a drill string, in particular between components of the bottom hole assembly, BHA, more particularly to connect drill collar parts. A connection of the invention may also be employed between two components of an oil working string or even risers.

Throughout the description, the expression "comprising a" should be assumed to be synonymous with "comprising at least one" unless specified to the contrary.

The invention claimed is:

1. A threaded tubular connection comprising:
a first tubular component made up onto a second tubular component, the tubular components being intended for exploration or working a hydrocarbon well, or to form a landing string;
the first tubular component comprising a first substantially cylindrical body with an axis of revolution terminated by an external abutment, the external abutment being linked to an external circumference of the first body via a fourth profile with an external diameter which increases from the external abutment towards the first body, and linked to a male threaded connection portion extended by a terminal non-threaded portion forming an internal abutment surface at its axial end, such that the internal abutment is linked to an internal circumference of the first body via a first profile with an internal diameter decreasing from the internal abutment towards the inside of the first body;
the second tubular component comprising a second substantially cylindrical body defining a bearing surface at one free end for the external abutment, the bearing surface being linked to an external circumference of the second body via a third profile with an external diameter which increases from the bearing surface towards the second body, the second body comprising an initial non-threaded portion on its internal surface linking the bearing surface to a female threaded connection portion which can be made up onto the male threaded connection portion, and terminating in an internal shoulder facing the internal abutment, the internal shoulder being linked to the internal circumference of the second body via a second profile with an internal diameter which decreases from the internal shoulder towards inside of the second body;
wherein at least one of the first profile or the second profile is convex or concave; and
a length of at least one of the first profile and the second profile along an axis of revolution is more than 1.5875 mm and less than a length of the terminal portion;
a length of at least one of the third profile and the fourth profile along the axis of revolution is more than 1.5875 mm and less than a length of the initial portion.

2. A connection according to claim 1, wherein the lengths of the first, second, third and fourth profiles are in a range of 3 mm to 50 mm, or in a range of 10 to 25 mm, or in a range 15 to 20 mm.

3. A connection according to claim 1, wherein the third profile is symmetrical with the fourth profile.

4. A connection according to claim 1, wherein the first profile is symmetrical with the second profile.

5. A connection according to claim 1, wherein one of the profiles has an inclination of more than 10°.

6. A connection according to claim 1, wherein one of the profiles has a portion with a convex curvature.

7. A connection according to claim 1, wherein one of the profiles has a portion with a concave curvature.

8. A connection according to claim 1, wherein one of the profiles is an arc of a circle or an ellipse.

9. A connection according to claim 1, wherein the internal abutment is linked to the terminal portion via a first inclined portion, and the internal shoulder is linked to a second base prolonged by the female connection portion via a second inclined portion, the two inclined portions being secants and each forming a non-zero angle with the contact plane between the internal abutment and the internal shoulder.

10. A connection according to claim 9, wherein the first and the second inclined portion have a common vertex.

11. A connection according to claim 1, wherein the bearing surface is linked to the initial portion via a third inclined portion and the external abutment is linked via a fourth inclined portion to a base prolonged by the male connection portion, the two inclined portions being secants and each forming a non-zero angle with the contact plane between the external abutment and the bearing surface.

12. A connection according to claim 11, wherein the third and fourth inclined portions have a common vertex.

13. An assembly comprising:
a first body and a second body, the two bodies being retained by a connection according to claim 1,
wherein the internal abutment has a radial thickness, configured to be brought into contact with the internal shoulder, which is determined to be capable of supporting, without observing yielding, a compressive force at least equal to 4.5 times a weight of the first body, or at least equal to 1.5 times a weight of at least two, or at least three, or four, tubular bodies connected end-to-end and terminated axially by the internal abutment.

14. An assembly according to claim 13, wherein the first body is welded to one end of a pipe body of revolution such that the external abutment is axially opposed to the weld, and the second body is welded to one end of another pipe body of revolution such that the bearing surface is axially opposed to the weld.

15. A method for connecting a threaded connection according to claim 1, wherein a makeup torque which is higher than the shouldering torque of said connection is obtained using tongs having a torque capacity of less than 101,686 Nm (75,000 ft·lb).

* * * * *